G. E. WHITNEY.
MACHINE FOR COMPRESSING BALED HAY.
APPLICATION FILED JUNE 10, 1915.
1,217,893.
Patented Feb. 27, 1917.
5 SHEETS—SHEET 1.
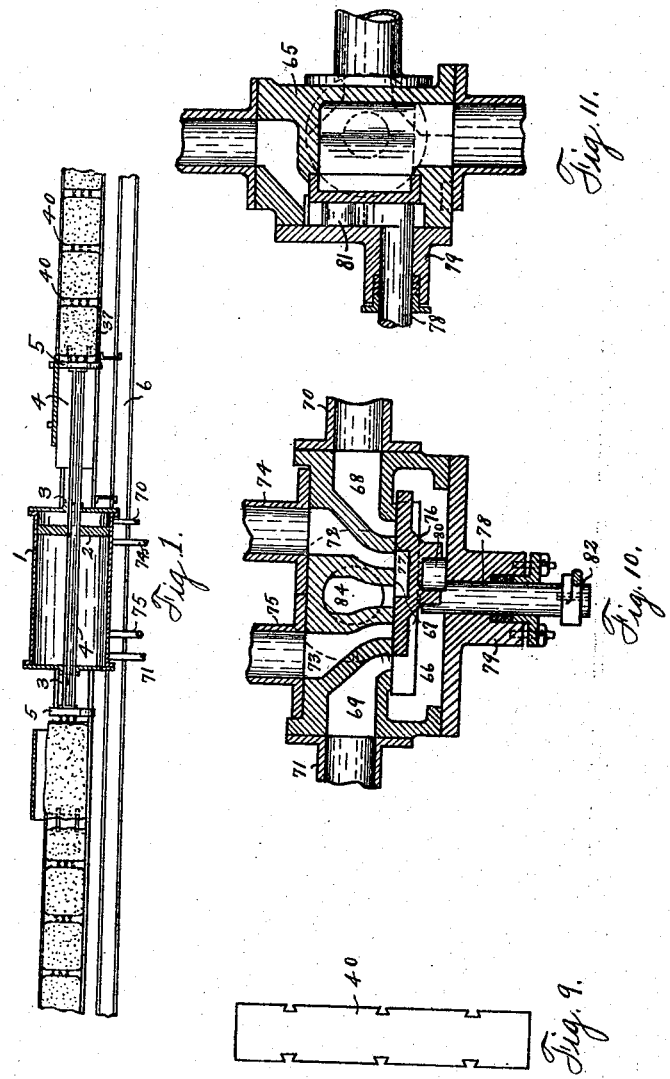
WITNESSES:
Fred. W. Stapleton
F. A. Liddell
INVENTOR
George E. Whitney
BY
Hardway Coetten
ATTORNEYS

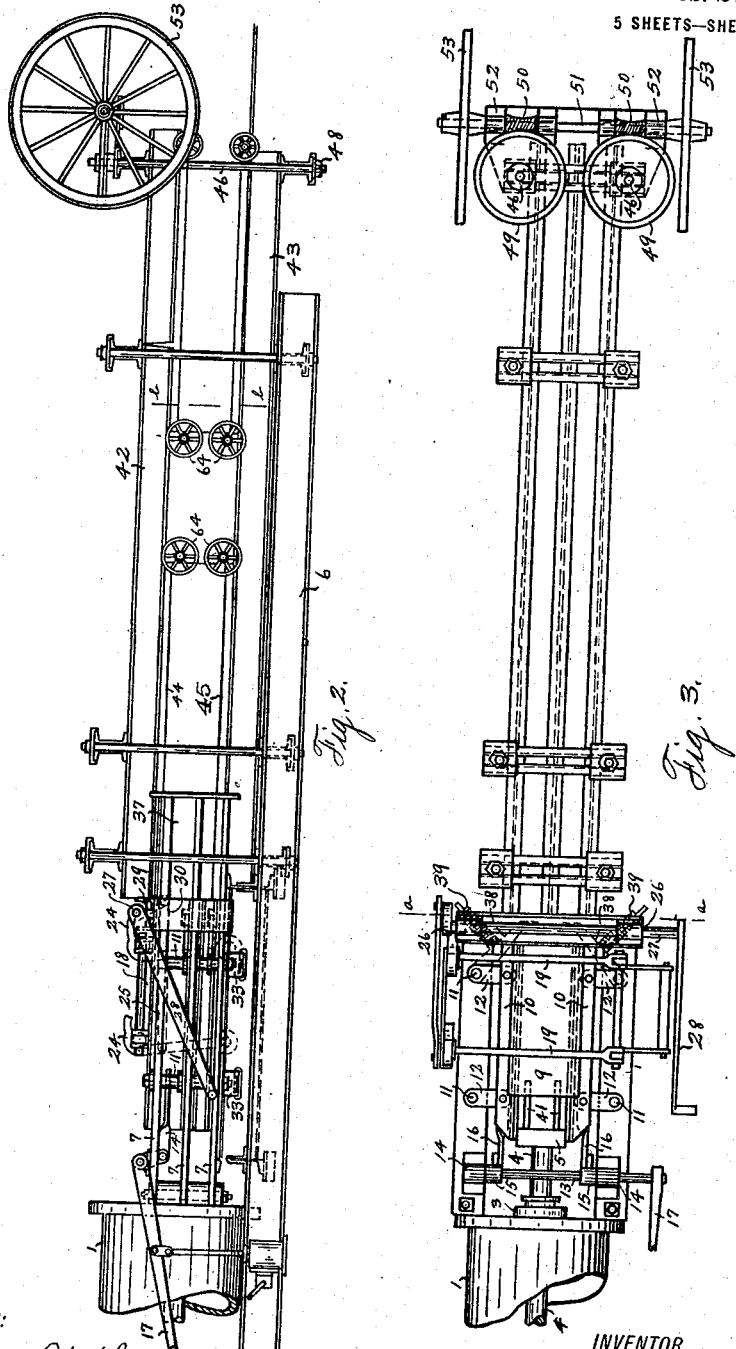

G. E. WHITNEY.
MACHINE FOR COMPRESSING BALED HAY.
APPLICATION FILED JUNE 10, 1915.

1,217,893.

Patented Feb. 27, 1917.
5 SHEETS—SHEET 3.

WITNESSES:
Fred. W. Stepleton
F. A. Liddell

INVENTOR
George E. Whitney
BY
Hardway & Carthy
ATTORNEYS.

G. E. WHITNEY.
MACHINE FOR COMPRESSING BALED HAY.
APPLICATION FILED JUNE 10, 1915.

1,217,893.

Patented Feb. 27, 1917.
5 SHEETS—SHEET 5.

UNITED STATES PATENT OFFICE.

GEORGE E. WHITNEY, OF BRIDGEPORT, CONNECTICUT, ASSIGNOR TO H. A. PAINE, OF HARRIS COUNTY, TEXAS.

MACHINE FOR COMPRESSING BALED HAY.

1,217,893.    Specification of Letters Patent.    Patented Feb. 27, 1917.

Application filed June 10, 1915. Serial No. 33,225.

*To all whom it may concern:*

Be it known that I, GEORGE E. WHITNEY, a citizen of the United States, residing at Bridgeport, in the county of Fairfield and State of Connecticut, have invented certain new and useful Improvements in Machines for Compressing Baled Hay, of which the following is a specification.

This invention relates to new and useful improvements in a machine for compressing baled hay.

The object of the invention is to provide a machine of the character described adapted to receive bales of hay, as formed by the ordinary hay baling machine and to compress the same to a greater density, for economy of space; the machine, however, may be also used for compressing loose hay, or other loose material into bales.

Another feature of the invention resides in the provision of a machine of the character described having a fluid pressure cylinder, whereby, plungers are reciprocated, which operate to compress the material into baling chambers arranged on each side thereof, thus forming a doubled ended compress, wherein each stroke of the piston in the cylinder will be effective in compressing the material in one chamber or the other, thus eliminating lost motion of said piston and the plungers driven thereby.

Another feature of the invention resides in the provision of a molding chamber, wherein the bale or other material to be compressed is first placed and formed so as to have the desired width and thickness by direct pressure before it is subjected to compression from the plunger.

A further feature resides in the provision of means for regulating the friction against the compressed bales, as they travel along the delivery track before they are discharged from the machine, thus controlling the amount of resistance against which the plunger must operate to produce the desired density of the bales being compressed.

Other features constituting improvements in principle and details of structure will be more specifically set forth in this specification and included in the claims appended hereto and made a part hereof.

With the above and other objects in view the invention has particular relation to certain novel features of construction, operation, and arrangement of parts, an example of which is given in this specification and illustrated in the accompanying drawings, forming a part hereof, wherein:

Figure 1, is a sectional side elevation of the complete machine.

Fig. 2, shows a side elevation of one end thereof.

Fig. 3, shows a plan view of the structure illustrated in Fig. 2.

Fig. 9, shows an edge view of the spacing block employed.

Fig. 10, shows a vertical sectional view of the mechanism for controlling the admission of motive fluid into the cylinder, and Fig. 11, shows a transverse sectional view thereof.

Figure 4:
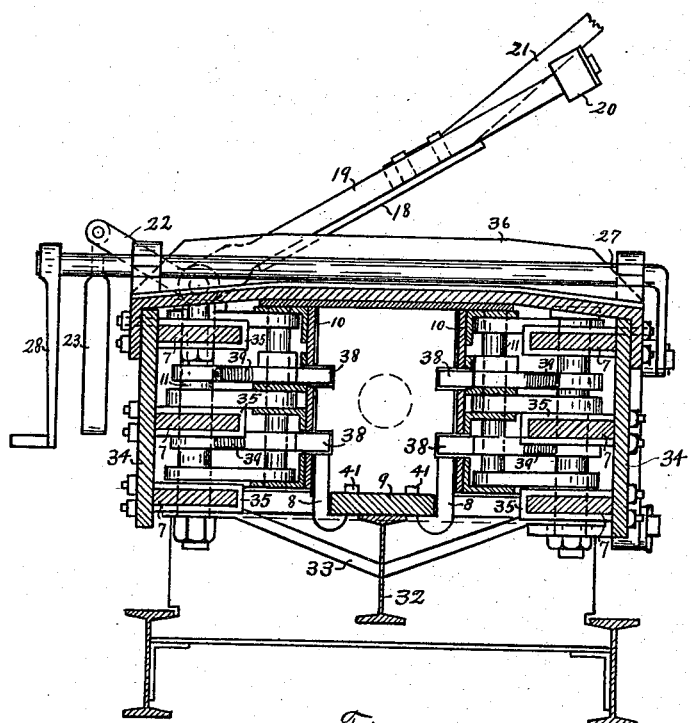
Fig. 4, shows a transverse sectional view of the molding chamber, of Fig. 1, showing the door thereof partially open.
Figure 5:
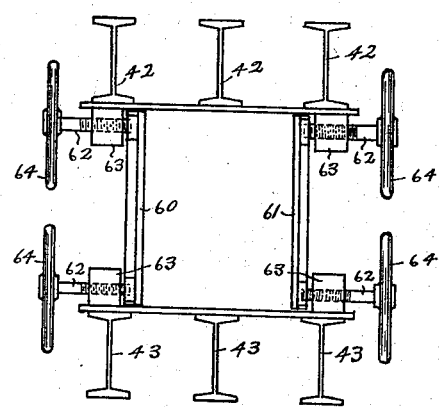
Fig. 5, shows a transverse sectional view, taken on the line *b—b* of Fig. 2.
Figure 6:
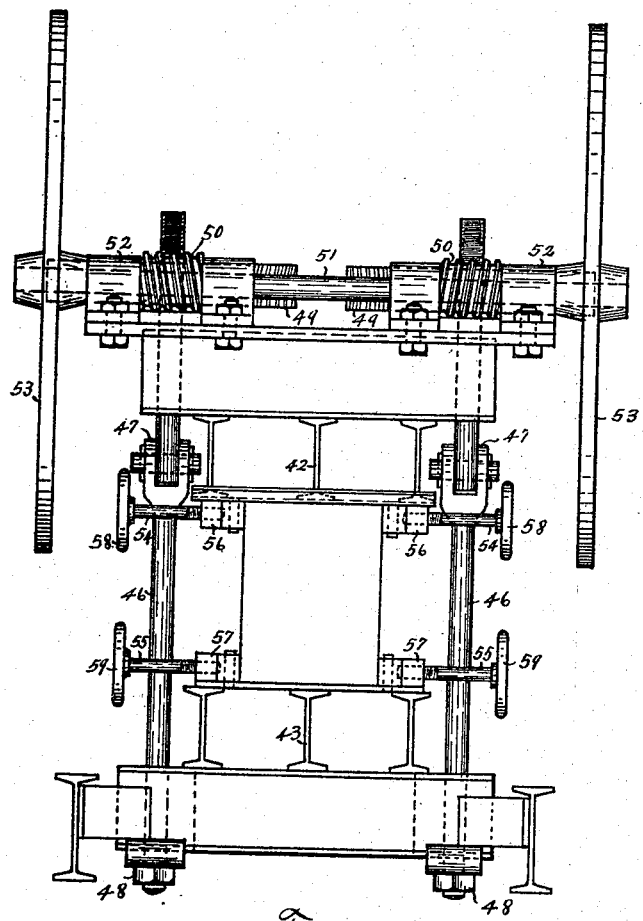
Fig. 6, shows an end view of the device.
Figure 7:
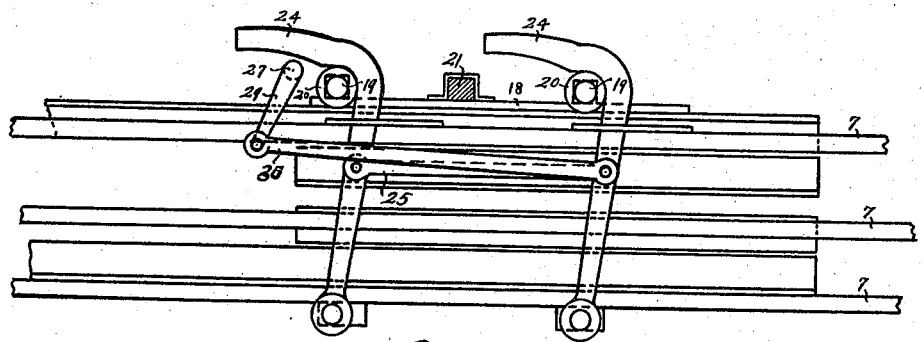
Fig. 7, shows a fragmentary side elevation of the molding chamber, showing the means for securing the door closed, said means being fully engaged.
Figure 8:
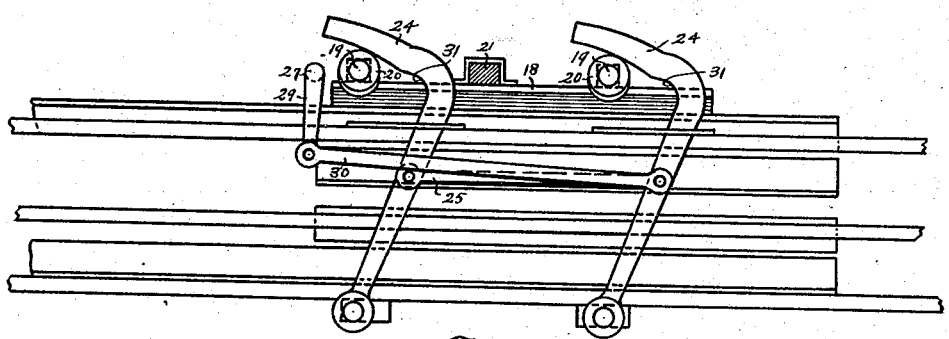
Fig. 8, shows a similar view of the molding chamber with the securing means only partially engaged.

Referring now more particularly to the drawings, wherein like numerals of reference designate similar parts in each of the figures, the numeral 1, refers to a fluid compression cylinder having the piston 2, reciprocating therein. This cylinder has a stuffing box 3, in each head thereof and piston rods 4, 4, are fixed to the piston and extend out through said stuffing boxes, the outer ends of said piston rods having the plungers 5, 5, fixed thereto. It will be observed from an inspection of Fig. 1 that the machine is duplex, the opposite ends thereof being in all respects similar, as shown in Fig. 1. The machine proper is mounted upon the foundation 6, consisting of the side I beams suitably anchored together. Fixed to each cylinder head is a molding chamber having the side bars 7, 7, 7, arranged on each side and spaced apart and having a bottom formed of a metallic slab. Each plunger 5, has the guidehooks 8, 8, secured to the respective edges thereof, which engage under and slide along the corresponding edges of the slab 9, and form a slidable anchorage for said plunger, and insure true movement thereof through the molding chamber. The molding chamber has also the movable side walls 10, 10, arranged within the side bars 7, which are movable toward and from each other by means of a mechanism, presently to be described. Two vertical rods 11, 11, are fixed in the side bars 7, on each side and anchor said bars in fixed relation and pivoted to each rod is a plurality of inwardly extending toggle levers 12, whose inner ends are pivoted to the respective side walls 10. A transverse shaft 13, is rotatably mounted in suitable bearings 14, 14, upon the molding chamber and adjacent said bearings the shaft has the arms 15, 15, fixed thereto and depending therefrom and the links 16, 16, are provided, one upon each side, whose ends are pivoted to the free ends of the arms 15, 15, and the side walls 10, 10, respectively. One end of the shaft 13, is extended and has the hand lever 17, fixed thereto, by means of which it may be partially rotated in either direction. It is obvious from an inspection of Figs. 2 and 3, that when the free end of the lever 17, is elevated, a pull will be exerted, through the arms 15, 15, and the links 16, 16 upon the side walls 10, 10, and said walls will be swung around on the toggle levers 12, in an arc, outwardly from each other, thus increasing the lateral dimension of the molding chamber. A door 18, is mounted upon the molding chamber and hinged to one side thereof, said door having the transverse cross bars 19, 19, whose free ends extend beyond the free edge of the door and have rollers 20, 20, mounted therein. This door is opened and closed by a suitable hand lever 21 and being of considerable weight has the arm 22, extending from the hinged edge thereof, suspended from which is the counter weight 23, to facilitate the opening thereof.

Pivoted to the side of the molding chamber and in alinement with said rollers 20, 20, when the door is closed, are the hooks 24, 24, which are connected by means of the link 25, which is pivoted at its respective ends to the corresponding hooks. Rotatably mounted in the bearings 26, 26, fixed upon the molding chamber on each side, is the transverse shaft 27, secured to one end of which is the hand lever 28. Fixed to and depending from this shaft is the short arm 29, and pivoted at its respective ends to the free end of the arm 29 and to one of said hooks 24, is the link 30. The material to be compressed, is first placed in the molding chamber between the movable walls 10, 10, and the door 18, is then closed. The downward pull on the free end of the lever 28, will operate through the arm 29 and link 30, to exert an outward pull on the hooks 24, 24, causing them to engage over the rollers 20, 20, and force said door 18, tightly closed. The operative faces of the hooks 24, 24, have the recesses, as 31, in which the rollers 20, 20, seat when said hooks are fully engaged, securing said hooks against disengagement from the bearings. A downward pull is then exerted on the lever 17, which will operate through the arms 15, 15, and the links 16, 16, to force the side walls 10, 10 around on the toggle levers 12, inwardly toward each other and against said bale.

As the plunger moves against the bale in the molding chamber on its compression stroke, the friction of the bale against said side walls, will move the walls on said toggle levers, in the direction of the plunger movement, farther than it is possible to do manually, thus contracting the molding chamber, and the force delivered from the plunger is utilized to add lateral compression against the bale in said chamber.

Centrally located under the bottom slab 9, of this chamber is the I beam 32, and the chamber is strengthened against spreading laterally by means of transverse bars 33, 33, spaced a suitable distance apart, which pass through slots in the web of the beam 32, and through alined apertures in the ends of which the lower ends of the rods 11, pass. Nuts are threaded onto the lower ends of said rods to secure the bars 33, 33, thereon. The discharge end of the molding chamber is further strengthened by the vertical side bars 34, 34, one being secured on each side to the bars 7, by means of U bolts, as 35, and the upper ends of the side bars are secured against spreading by the transverse tie-bar 36, whose ends are bolted, respectively, to the corresponding ends of the side bars 34.

In alinement with the molding chamber and fixed to the outer end thereof in any approved manner, is the baling chamber 37, having solid sides, top and bottom and being of the dimensions necessary to produce the desired compressed bale. As a rule two and some times three of the ordinary bales of hay or other material will be compressed into one bale, the density depending upon the amount of friction to be overcome by the plunger in moving the bales along the track, hereinafter described and discharging them from the machine.

Fixed on the shafts 11, 11, which are arranged nearest the discharge end of the molding chamber on each side, are the dogs 38, 38, whose free ends project into the path of the bale, as it moves along from the molding chamber into the compress chamber. As the hay is driven along under the influence of the plunger, the dogs yield, permitting it to pass, but when it has been forced past said dogs, they are restored to their original position by the spring seats 39, 39, which rest against said dogs, and force them to engage in behind the hay and retain it in the baling chamber when the pressure of the plunger against it has been released.

At suitable intervals spacing blocks, as 40, are arranged between the compressed bales. These blocks, when placed in position, rest upon the short ribs 41, 41, arranged at the feed end of the molding chamber and upstanding from and integral with the bottom 9, thereof and rests against the face of the plunger, when in its withdrawn position. The material to be compressed is then placed in the molding chamber, and, as the plunger is driven forward, the spacing block will be moved along toward the discharge end of the chamber and when it passes from said ribs, will be held clear of the bottom of the chamber. The block will thus be kept free from contact and friction against the bottom of the chambers, as it moves along and will not be injured thereby. It is essential that this block be somewhat less in its vertical and lateral dimensions than the corresponding dimensions of the chambers through which the bales pass, inasmuch as the discharge end of the machine is somewhat contracted and a certain amount of clearance must be provided to permit the block to pass through this contracted discharge without injury. Each face of each spacing block has lengthwise grooves, dove-tailed in cross section and, when the compressed bales pass from the baling chamber 27, tying wires are inserted through said grooves and around the compressed bales and tied.

The bales pass from the baling chamber 37, into a track formed of the upper and lower oblong plates, which are extended to any desired length and which are reinforced above and below by means of I beams 42, and 43. The edges of said plates have flanges 44, and 45, depending from the upper plate and projecting upwardly from the lower one, respectively, forming guides for the bales and holding them in alinement as they pass along said track. At the discharge end of the track are the vertical tie rods 46, 46, one on each side, each rod being formed of sections united by the joints 47, 47. The lower ends of these rods are secured to the lower part of the track by the nuts 48, 48, which are screwed onto the lower ends thereof to prevent their withdrawal from said bearing. The upper ends of the rods pass through bearings in the upper part of the track and have the worm gear wheels 49, 49 threaded thereon, which are in mesh with the worm gears 50, 50, fixed upon the transverse shaft 51, which is mounted in suitable bearings 52, 52, carried upon the forward end of the upper part of the track. This shaft has hand wheels 53, 53, fixed upon each end thereof, by means of which it may be revolved and the gear wheels 49, 49, rotated with the obvious result that the discharge end of the track is contracted or enlarged, as may be desired. The forward ends of the flanges 44, and 45, on each side are free and the shafts 54 and 55, are threaded through tapped holes in the respective bearings 56 and 57, and their inner ends rest against said flanges. The outer ends of these shafts are provided with the hand wheels 58 and 58, by means of which the shafts may be rotated and said flanges forced inwardly, thus contracting the discharge end of the track laterally, and, when said shafts are rotated in the opposite direction, the pressure of the bale against these flanges will operate to enlarge the discharge. This mechanism for contracting the discharge end of the track is necessary in order to regulate the amount of friction against the bales passing through the machine and thus, to control the resistance against the plunger and regulate the density of the bales.

Near the discharge end of the track on each side are friction doors 60, 61, which are laterally movable relative to the track. The upper and lower edges of these doors have a swivel connection with the inner ends of the shafts 62, 62, which are threaded through corresponding bearings 63, 63, fixed to the outer edges of the upper and lower plates of the discharge track. Fixed to the outer ends of the shafts 62, 62, are the hand wheels 64, 64, by means of which said shafts may be rotated and the friction-doors forced toward or from each other. These friction-doors are provided to also regulate the amount of friction against bales passing along the track, for the same purpose as hereinbefore indicated. Owing to the dimensions of the spacing blocks 40, the discharge end of the track should ordinarily be contracted only a limited amount, as space must be left for said blocks to pass through, and it is desirable that the blocks be made as large as possible, so as to form the bales with smooth, square ends and prevent the formation of uneven projections around the edges of the block. The friction-doors are provided, so that only a small amount of contraction at the discharge end of the track will be necessary, the doors forming a supplemental friction means, which assists in providing the desired friction in order to give the proper amount of resistance to the plunger so as to give the proper density to the compressed bales.

For the purpose of controlling the admission of the motive fluid into the cylinder 1, a valve mechanism has been provided which will now be described:—

A steam chest 65, is arranged alongside the cylinder 1, having the steam chamber 66, one side of which is formed into the seat 67. From opposite ends of the chamber lead the ports 68, 69, which pass through said seat and communicate with the pipes 70, 71, respectively. These pipes enter the cylinder 1, on opposite sides of the piston 2, the entrant parts being adjacent the respective cylinder heads. Exhaust ports 72, 73, leading through the seat 67, between the steam ports, are spaced apart and communicate with the steam chamber, and a central exhaust port 84, is provided through the seat through which the spent steam is conducted from the discharges 72, 73. These discharges communicate with the cylinder 1, through the discharge pipes 74, 75, which enter said cylinder on opposite sides of the piston between the inlet pipes and are spaced a short distance from said respective pipes. A slide valve 76, is mounted in the steam chest against the seat 67, and its contacting face has the centrally located rectangular cavity 77, of a width sufficient to communicate with the exhaust 84, and the ports 72 and 73, alternatively.

A valve stem 78, is rotatably mounted in the bearing 79, in the side of the steam chest and the inner end of this stem has the finger 80, extending laterally therefrom, whose free end projects into the bearing 81, in the back of the valve. Fixed to the outer end of the valve stem is the hand lever 82, by means of which said stem may be partially rotated in each direction and the valve moved back and forth. When the valve is moved to one end of the steam chest it will close one port, as 68, and open the corresponding exhaust port 72, at said end and at the same time will clear the inlet and close the exhaust port at the opposite end of the chamber. The entry of live steam into the cylinder through the pipe 71, will drive the piston along and the spent steam in front of it will be discharged through the pipe 74, until said pipe is blocked by the piston. A cushion of steam will then be trapped between the piston 2, and the head it is approaching by reason of the fact that the inlet 68, is closed by the valve. The valve face is extended each way beyond the cavity 77, a sufficient distance to completely block the corresponding inlet and the opposite discharge, when said valve is moved to either end of the steam chamber.

Upon the reversal of the lever 82, the inlet 67, and discharge 72, will be blocked and the others opened with the obvious opposite result with respect to the piston movement. It is thus apparent that a steam cushion will be trapped between each cylinder head and the piston just before the piston has reached the limit of its movement in either direction, and the piston will be prevented from striking against said head. Injury to and breakage of said piston and heads is thus avoided.

One of the chief features of this machine consists of horizontally arranged chambers on opposite sides of the compression cylinder and so arranged that each stroke of the piston is a working stroke operating to compress the hay in one chamber or the other, so that hay is being continuously compressed on each side of the cylinder and, as the bales are discharged from the baling chambers and move along the tracks, receiving therefrom, they may be tied as they move along, so that said bales are successively formed and tied without stopping the operation of the machine to allow time for tying the bales.

I claim—

1. In a device of the character described, the combination with a chamber wherein bales are formed of means actuated by the bale for varying the dimensions thereof and a compressing means reciprocating in the chamber.

2. In a device of the character described, the combination with a chamber wherein bales are formed of movable side walls, manual means for moving said walls to vary the capacity of the chamber, a compressor arranged to reciprocate in the chamber and compress the bale therein, said walls being also actuated by the friction of the bale to contract the chamber.

3. In a device of the character described, the combination with a chamber having movable side walls, of a door hinged to the chamber wall, and forming a covering for the chamber, rollers mounted upon the free edge of the door, hooks pivoted to the chamber wall and alined with said rollers, when the door is closed and means for engaging the hooks over the rollers.

4. In a device of the character described, the combination with a bale molding chamber, of means actuated by the bale passing therethrough for varying the dimensions thereof, a plunger reciprocating therein and a baling chamber having fixed dimensions secured to and in alinement with the molding chamber.

5. In a device of the character described, the combination with a molding chamber wherein bales are formed, of means actuated by the moving bales for varying the dimensions thereof, a plunger reciprocating therein, a baling chamber having fixed dimensions secured to and in alinement with the molding chamber and a track fixed relative to and continuing from the baling chamber.

6. In a device of the character described the combination with a molding chamber for forming bales, of means actuated by the moving bales for varying the capacity thereof, a plunger reciprocating therein, a baling chamber having fixed dimensions fixed relative to and alined with the molding chambers, a track arranged to receive the contents discharged from the baling chamber and means for controlling the friction of the track against the contents thereof passing therealong.

7. A device of the character described including a molding chamber wherein bales are formed and having laterally movable sides which are actuated by the moving bales to contract the chamber, a plunger arranged to reciprocate therein and means in operative connection with the plunger and driving the same.

8. A device of the character described including the combination with a chamber wherein bales are formed and having laterally movable sides, of a plunger reciprocating therein, means in operative connection with the plunger for actuating the same, a manual mechanism operatively connected with said side and provided to move the same so as to contract or expand the chamber, said sides being mounted so as to be actuated by the moving bales to contract the chamber.

9. In a device of the character described, a chamber having laterally movable sides, a manual means for moving said sides toward and from each other, so as to contract or expand said chamber laterally, a door forming the top of the chamber hinged thereto at one side, anti-friction roller bearings carried by the free edge of said door, engaging hooks pivoted to the side of the chamber and in alinement with said bearings when the door is closed and means for manipulating the hooks to engage them over said bearings and secure said door in closed position.

10. In a device of the character described, a chamber having laterally movable sides, a manual means for moving said sides toward and from each other so as to contract or expand said chamber laterally, a door forming the top of the chamber and hinged thereto at one side, anti-friction roller bearings carried by the free edge of said door, engaging hooks pivoted to the side of the chamber and in alinement with said bearings when the door is closed, means for manipulating the hooks to engage them over said bearings and secure said door in closed position, all in combination with a plunger arranged to reciprocate in said chamber and means in operative connection with said plunger and driving the same.

11. In a compressing machine, the combination with a horizontally disposed molding chamber for receiving materials to be compressed, of laterally movable side doors therefor, means for mechanically moving said doors against said material, a plunger for driving said material through the chamber and means for mounting said doors through which the friction of the material, as it passes through the chamber, against said doors will operate to further contract the chamber.

12. In a compressing machine, the combination with a horizontally disposed molding chamber for receiving materials to be compressed, of laterally movable side doors therefor, means for automatically moving said doors against said material, a plunger for driving said material through the chamber and means upon which the doors are mounted, operating to contract said doors against the material by reason of the friction of said material against the doors.

13. In a machine for compressing hay and the like, the combination with a molding chamber, of side doors laterally movable relative thereto, a door hinged to the chamber wall and forming a covering for the chamber, rollers mounted upon the free edge of said door, hooks pivoted to the chamber wall and alined with said rollers when the door is closed and arranged to engage thereover, the contacting faces of said hooks against said rollers being inclined with respect to the line of travel thereof and being provided with recesses in which said rollers rest when the hooks are fully engaged thereover, and which prevent the disengagement of the hooks because of direct pressure against the door.

14. In a machine for compressing hay and the like, the combination with a molding chamber, of side doors laterally movable relative thereto, a plunger arranged to reciprocate therein, a door hinged to the chamber wall and forming a covering for the chamber, a roller mounted upon the free edge of said door, a hook pivoted to the chamber wall and alined with said roller when the door is closed, and arranged to engage over said roller, the contacting face of the hook against the roller being inclined with respect to the line of travel thereof and having a recess in which the roller seats when the hook is fully engaged thereover to prevent the disengagement of the hook by reason of direct pressure against the door.

15. In a device of the character described the combination with a chamber having movable side walls, of a door hinged to the chamber and forming a covering therefor, bearings carried by the free edge of the door, means pivoted to the chamber wall in alinement with said bearings when the door is closed and a mechanism for engaging said means over the bearings to secure the door in closed position.

16. A device of the character described including two molding chambers spaced apart each chamber having laterally movable side walls which are actuated by the contents of the chamber moving through said chamber, a plunger arranged to reciprocate in each chamber and means between the chambers and in operative connection with said plungers and simultaneously driving the same.

17. A device of the character described including a combination with a chamber wherein balse are formed, said chamber having laterally movable sides, of toggle levers whereon said sides are mounted, a plunger reciprocating in said chamber means for reciprocating the plunger and a mechanism operatively connected with said sides and arranged to move the same on said toggle levers to contract or expand the chamber.

18. In a compressing machine the combination with a molding chamber for receiving material to be compressed of laterally movable sides therefor, means for mechanically moving said sides against said material, a plunger for driving said material through the chamber and toggle levers whereon said sides are mounted whereby the friction of the material against said sides operates to swing the sides inwardly to contract said chamber.

In testimony whereof I have signed my name to this specification in the presence of two subscribing witnesses.

GEORGE E. WHITNEY.

Witnesses:
F. C. FORD,
F. A. LIDDELL.

Copies of this patent may be obtained for five cents each, by addressing the "Commissioner of Patents, Washington, D. C."